(12) United States Patent
Nygren, Jr.

(10) Patent No.: US 6,360,995 B1
(45) Date of Patent: Mar. 26, 2002

(54) DOCKING SYSTEM & METHOD FOR SPACE TRAVEL VEHICLE

(75) Inventor: William D. Nygren, Jr., Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/643,818

(22) Filed: Aug. 22, 2000

(51) Int. Cl.$^7$ ................................................ B64G 1/64
(52) U.S. Cl. ..................... 244/161; 244/115; 244/135 A
(58) Field of Search ................................. 244/115, 116, 244/161, 158 R, 135 A; 473/514; 273/348.4; 294/106, 86.4, 902; 414/406–408, 620, 621

(56) References Cited

U.S. PATENT DOCUMENTS

| | | | |
|---|---|---|---|
| 1,531,352 A | 3/1925 | Smith .................................. 1/1 |
| 1,659,758 A | * 2/1928 | Auberlin ..................... 244/116 |
| 2,821,317 A | * 1/1958 | Locke |
| 3,525,483 A | 8/1970 | Alstyne ........................... 244/1 |
| 3,587,999 A | 6/1971 | Miniovitch et al. .............. 244/1 |
| 3,737,117 A | 6/1973 | Belew ............................. 244/1 |
| 4,030,102 A | * 6/1977 | Kaplan et al. |
| 4,195,804 A | * 4/1980 | Hujsak et al. ............... 244/161 |
| 4,491,289 A | 1/1985 | Rinn et al. ................... 244/158 |
| 4,712,753 A | 12/1987 | Howard ....................... 244/161 |
| 4,750,692 A | 6/1988 | Howard ....................... 244/158 |
| 4,756,493 A | 7/1988 | Camaret ...................... 244/158 |
| 4,762,295 A | 8/1988 | Yon, Jr. ........................ 244/115 |
| 5,027,892 A | 7/1991 | Bannon et al. ................. 165/41 |
| 5,150,770 A | 9/1992 | Secci ............................. 185/40 |
| 5,279,482 A | 1/1994 | Dzenitis et al. ............. 244/161 |
| 5,364,046 A | 11/1994 | Dobbs et al. ................ 244/161 |
| 5,398,983 A | * 3/1995 | Ahrens ......................... 294/106 |
| 5,429,325 A | 7/1995 | Hunt ............................ 244/115 |
| 5,810,296 A | 9/1998 | Izumi ........................... 244/173 |
| 5,826,832 A | 10/1998 | Stich et al. .................... 244/173 |

* cited by examiner

*Primary Examiner*—Galen L. Barefoot
(74) *Attorney, Agent, or Firm*—Marsh Fischmann & Breyfogle LLP

(57) ABSTRACT

A system and method for docking a space object to a space travel vehicle is disclosed. The space travel vehicle includes a frame assembly which may be deployed into an at least generally funnel-shaped profile at the desired time. A web of sorts is attached to the frame assembly and is disposed into an at least generally funnel-profile by the deployment of the frame assembly as well. In one embodiment the web is in the form of a plurality of Velcro tape members. A space object contacting the web is detachably adhered thereto by including suitable fasteners on the space object as well. Retraction of the frame assembly directs the space object into a space object receptacle of the space travel vehicle, detaches the tapes from the captured space object, and retains the captured space object within the space object receptacle. After the captured space object has been retrieved, the frame assembly may thereafter be deployed to capture another space object in the above-described manner.

37 Claims, 4 Drawing Sheets

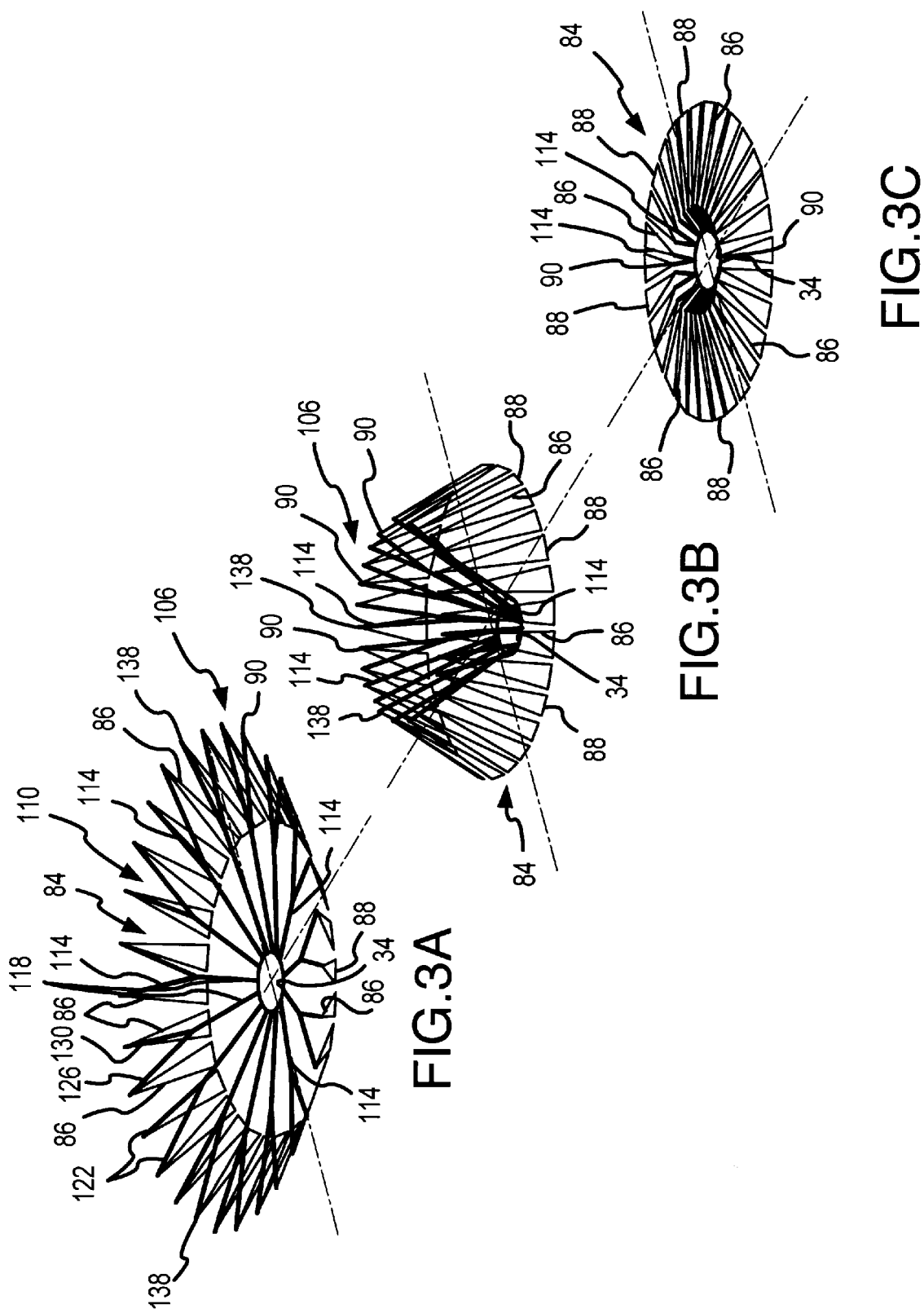

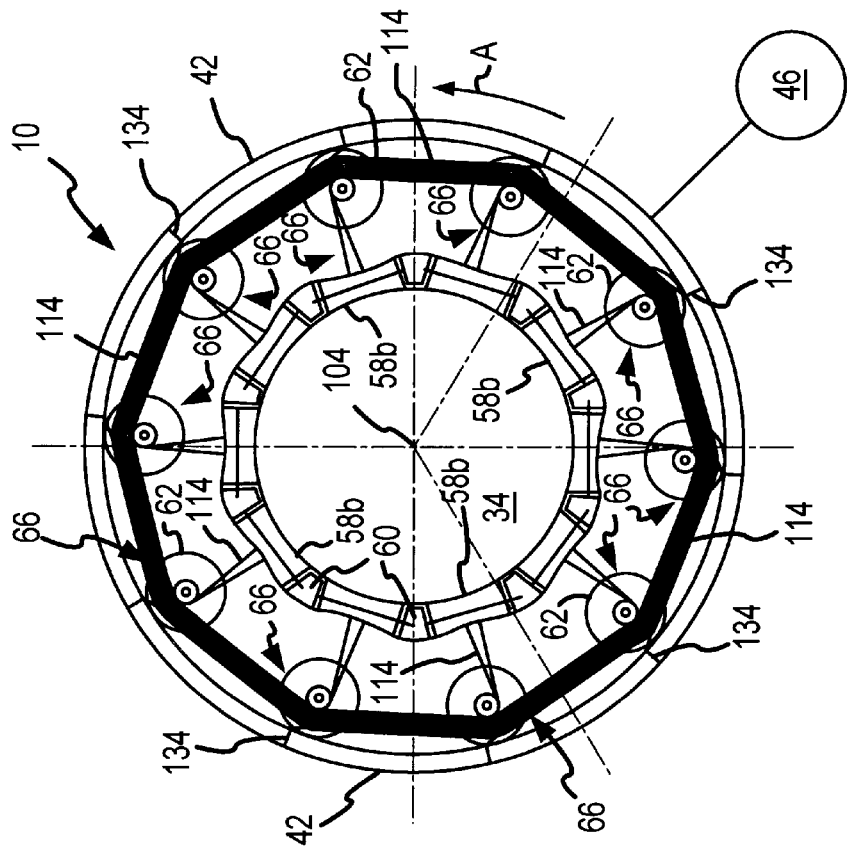
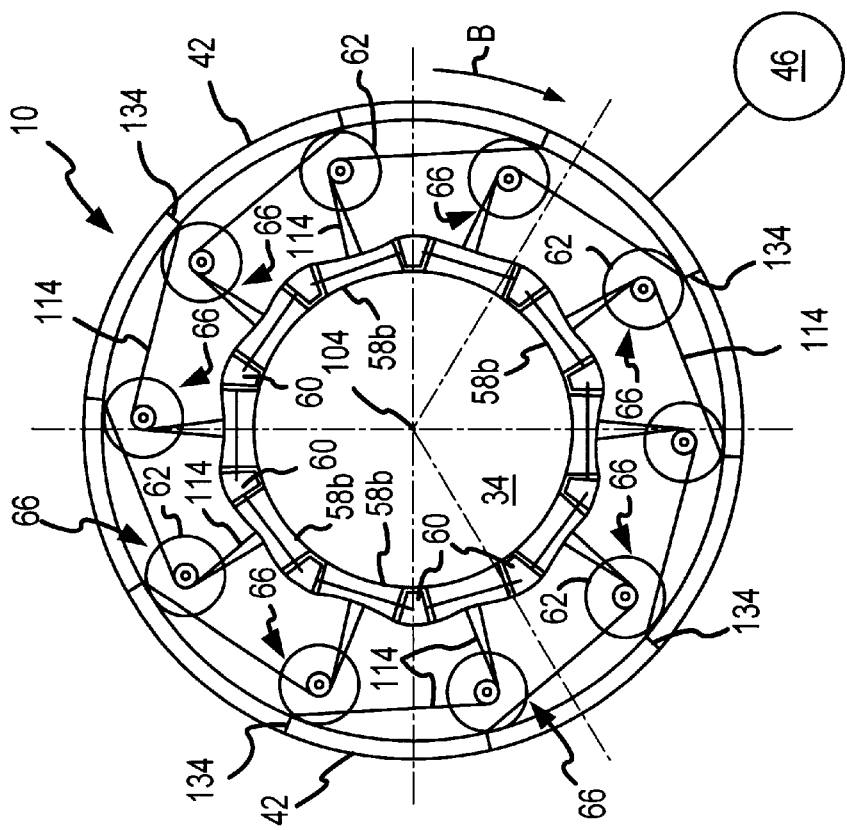

DOCKING SYSTEM & METHOD FOR SPACE TRAVEL VEHICLE

CROSS-REFERENCE TO RELATED APPLICATIONS

Not applicable.

STATEMENTS REGARDING FEDERALLY SPONSORED RESEARCH OR DEVELOPMENT

Not applicable.

FIELD OF THE INVENTION

The present invention generally relates to the field of space travel vehicles and, more particularly, to docking systems and methods for such space travel vehicles.

BACKGROUND OF THE INVENTION

Docking systems are used by space travel vehicles to receive/engage objects when in space (hereafter "space object(s)"), such that the space travel vehicle and space object are then interconnected in at least some manner and for one or more purposes. Representative "space objects" of this type include other space travel vehicles, satellites, nanosatellites, free-flying satellites, and the like. Numerous types of docking systems/methods have at least been discussed in the literature, although the same have not necessarily been incorporated on a space travel vehicle which has actually flown in space. Booms have been proposed for space travel vehicles to facilitate the docking of another space object thereto by having the boom extend beyond the space travel vehicle in a deployed position. Typically the space object will include an at least generally conically-shaped cone to direct the end of the boom into a receiving receptacle, cavity, or the like on the space object as the space travel vehicle moves relatively toward the space object. Once the end of the boom is disposed in this receiving receptacle, typically some type of locking/latching mechanism is activated (e.g., by having the end of the boom be appropriately contoured/configured). At least one published docking station then retracts the boom to complete the docking of the space object to the space travel vehicle (with the boom) to dispose the space travel vehicle and space object in mating relation. Such a mating relation is also established by another type of docking system which utilizes mating cones (e.g., a "convex" cone on the space travel vehicle and a similarly sized "concave" cone on the space object, or vice versa).

Another type of docking system which has been discussed in the literature is commonly referred to as a "bola." These bolas include a main line of an appropriate material (e.g., cable) which is propelled from the space travel vehicle toward the space object which is to be docked to the space travel vehicle. Disposed on the end of this main line are a plurality of secondary lines which effectively wrap around the space travel object to capture the same so as to effectively "lasso" the space object. Various types of structures have been proposed to facilitate this wrapping action and/or the manner in which these secondary lines engage the space object. Nonetheless, the main line is then retracted to dock the space object to the space travel vehicle.

BRIEF SUMMARY OF THE INVENTION

The present invention is generally directed toward to a system/method for docking a space object to a space travel vehicle or the like. A first aspect of the present invention is embodied by a space travel vehicle which includes a space travel vehicle body and a space object docking system which is interconnected with this space travel vehicle body (e.g., integral therewith, detachably interconnected therewith so as to provide a discrete subassembly which may be retrofit on existing space travel vehicles). The space object docking system includes a frame assembly formed by a plurality of individual frame members (e.g., bipod arms). Each frame member is pivotally connected to the space travel vehicle body to allow each frame member to move between a stowed position (e.g., where the plurality of frame members are at least substantially contained within a single reference plane or disposed in at least substantially coplanar relation to provide a reduced storage volume) and a deployed position where the plurality of frame members collectively define an at least generally funnel-shaped profile. Another part of the space object docking system is a space object capture envelope assembly which is interconnected with the noted frame assembly and which occupies a space within the generally above-noted funnel-shaped profile defined by the frame assembly when in its deployed position.

Various refinements exist of the features noted in relation to the subject first aspect of the present invention. Further features may also be incorporated in the subject first aspect of the present invention as well. These refinements and additional features may exist individually or in any combination. The space travel vehicle may include a space object receiving cavity. Certain characterizations may be made of the frame assembly in relation to this space object receiving cavity. One such characterization is that the pivotal connection between each of the individual frame members of the frame assembly may be characterized as being disposed about this space object receiving cavity in spaced relation thereto. An example of "being disposed about" is that the noted pivotal connections may be disposed on a reference circle whose center corresponds with a center of the space object receiving cavity, such that the pivotal connections are radially spaced along this reference circle (e.g., disposed at different radial positions relative to the center of the reference circle, as well as being disposed radially outwardly from this center of the noted reference circle).

The frame assembly may be disposed relative to the above-noted space subject receiving cavity and/or pivotable relative to the space travel vehicle such that when the frame assembly moves from the deployed position to the stowed position, the frame assembly directs a space object which has adhered to the capture envelope assembly toward and preferably into the space object receiving cavity. Consider the case where each frame member may be characterized as having a pair of ends. A first of these ends may be that which is pivotally connected with the space travel vehicle body, and a second of these ends may be that which is "free" to move toward/away from the space object receiving cavity through pivotal movement of the associated frame member. In this case the second or "free" end of each individual frame member may be disposed at least generally proximate the space object receiving cavity when the frame assembly is in its stowed position (including actually extending within the space object receiving cavity), and its corresponding first end may be disposed further from the space object receiving cavity. Therefore, by pivoting the individual frame members from the deployed position to the stowed position about their corresponding first ends, the second end of each frame member will at least generally move toward the space object receiving cavity. This motion of the frame assembly may then be used to direct a space object which has adhered to the space object capture envelope toward and more preferably actually into the space object receiving cavity. Conversely, when the frame assembly is moved from the stowed position to the deployed position, the second end of each frame member will move at least generally away from the space object receiving cavity to define the noted at least generally funnel-shaped profile for the frame assembly when in the deployed position. Typically the frame members will be pivoted an amount so that the second end of each individual frame member will be disposed further from the space object receiving cavity than its corresponding first end when the frame assembly is in its fully deployed position.

As noted above, the individual frame members may be in the form of a bipod arm or the like. Other configurations may be appropriate as well. In addition, at least some of the frame members may be configured/adapted to facilitate directing a space object which has adhered to the capture envelope assembly into the noted space object receiving cavity. One such configuration is where the subject frame member extends axially away from the pivotal connection on the space travel vehicle body to a first location at a first angle relative to a reference plane (e.g., one which contains the plurality of pivotal connections of the frame members to the space travel vehicle body) when the frame assembly is in the deployed position, and thereafter where the subject frame member or an extension thereof extends axially away from this first location to a second location at a second angle relative to this same reference plane, with the second angle being of a greater magnitude than the first angle (e.g., an end section of such a frame member or an extension thereof may be "cocked" or "tipped" in to a certain degree when the frame assembly is in the deployed position). Another way of characterizing this feature of at least some of the frame members is that part of a given frame member may be disposed in an orientation which is defined by a first slope, and another distally-disposed part of this same frame member or an extension thereof (i.e., a part which is disposed further from the pivotal interconnection of the subject frame member) may be disposed in an orientation which is defined by a second slope which is greater than the first slope.

The capture envelope assembly may take the form of a space object capturing web or the like. This web may be disposed entirely within the confines of the at least generally funnel-shaped profile of the frame assembly when in its deployed position. The capture envelope assembly may be defined by a plurality of individual strap members. Each of these strap members may include at least one Velcro surface for establishing a mechanical interconnection with a space object which is directed at least generally toward the funnel-shaped profile of the frame assembly when in the deployed position and which includes one or more Velcro surfaces as well (e.g., nylon, metal). Any type of adhering-based detachable interconnection may be provided between the strap members and the space object (e.g., magnetic, mechanical, chemical). Structure may be provided for removing any such strap member which has adhered to the space object by a detachable engagement. For instance, any such strap member which is adhered to the space object may be removed therefrom as the space object is directed into the space object receiving cavity of the space travel vehicle by pivoting the frame assembly from the deployed position to the stowed position and simultaneously "peeling" the strap members from the exterior surface of the captured space object.

Each strap member of the capture envelope assembly may be characterized as having a pair of ends. One of these ends may be attached to a tape retraction mechanism (e.g., a rotatable mounting ring which is disposed radially outwardly from and about the space object receiving cavity), while the other of the ends may be attached to least one of the frame members of the frame assembly. For instance, a generally Y-shaped configuration may be incorporated on at least one of the ends of each such strap member such that it actually interfaces with two frame members. In any case, retraction of the individual strap members may then be used to move the frame assembly from the deployed position to the stowed position. Only one drive source is needed to simultaneously "reel in" all of the strap members and collapse the frame assembly. Again, this same retraction of the individual strap members may also be used to separate any such strap member which has adhered to space object which was captured by the capture envelope assembly as noted above.

Each strap member may extend outwardly from the above-noted space object receiving cavity to interconnect with one or more of the frame members when the frame assembly is in the deployed position. The strap members may be maintained in tension when the frame assembly is in the deployed position (e.g., by the individual frame members being biased to the deployed position by one or more springs). Moreover, each strap member may be maintained in spaced relation to the frame assembly between the space object receiving cavity and where the subject strap member actually interconnects with its corresponding frame member (s). Therefore, the plurality of frame members maybe viewed as defining a first at least generally funnel-shaped profile, and the plurality of strap members may be viewed as defining a second at least generally funnel-shaped profile which is disposed entirely within the first at least generally funnel-shaped profile. Another way of characterizing the relationship between the plurality of strap members and the frame assembly is as having a "trampoline-like" configuration/construction.

A preferred configuration of the subject first aspect of the present invention will be summarized. The space travel vehicle includes a space object receiving cavity for "docking" a space object to the space travel vehicle. The plurality of frame members are pivotally interconnected with the space travel vehicle body equidistantly from this space object receiving cavity, and are equally spaced about this space object receiving cavity (e.g., disposed at arcuately or radially spaced locations). Each frame member extends at least generally toward the space object receiving cavity when the frame assembly is in its stowed position, and each such frame member pivots relative to the space travel vehicle body so as to move at least generally away from the space object receiving cavity as the frame assembly moves from its stowed position to its deployed position, where the individual frame members again collectively define an at least generally funnel-shaped profile.

The capture envelope assembly includes a plurality of strap members. One end of each strap member is fixed to a retraction assembly mount which is disposed about the space object receiving cavity and which is rotatable relative to the space travel vehicle body. Each strap member extends radially inwardly from this retraction assembly mount to the space object receiving cavity, around the structure which defines the space object receiving cavity, and then radially outwardly from the space object receiving cavity for interconnection with at least one frame member. The frame assembly with the plurality of strap members attached thereto may be deployed by a biasing mechanism which biases the frame assembly to a deployed position and which may be realized by "unlocking" the frame assembly. One way for "unlocking" the frame assembly is to rotatably drive the retraction assembly mount in a direction to "unreel" the plurality of strap members therefrom. The biasing mechanism(s) is then able to deploy the frame assembly, and preferably the "magnitude" of the biasing and the speed at which the plurality of strap members are "unwound" from the retraction assembly mount is "matched" so that there is at least a certain amount of tension in the plurality of strap members throughout deployment of the frame assembly. This tension is preferably maintained in the fully deployed position as well. Moreover, between where the strap members exit the space object receiving cavity and where the strap members are attached to the frame members of the frame assembly, the strap members and frame assembly are maintained in spaced relation which yields a trampoline-like configuration for the space object docking system.

The plurality of strap members collectively define a funnel-shaped surface which is disposed within the funnel-shaped surface or profile defined by the plurality of frame members of the frame assembly. This funnel-shaped surface defined by the plurality of strap members is formed from Velcro or other appropriate materials which will allow the strap members to appropriately adhere to a space object. Appropriate surfaces may also be provided on the surface of the space object such that when it contacts any portion of the funnel-shaped surface defined by the plurality of strap members, the space object will adhere to the strap member (s), preferably in a detachable manner. Initial contact between the space object and the funnel-shaped surface collectively defined by the plurality of strap members may cause at least part of the frame assembly to at least initially move back toward its stowed position. This may absorb some of the energy of the impact, such as by "working against" any biasing forces being exerted on the frame assembly to direct the same to the fully deployed position. It may also be used to increase the contact area between the plurality of strap members and the captured space object, which in turn increases the surface area over which the space object is adhered to the strap members.

Completion of the docking of a space object to the space travel vehicle when the space object is captured in the above-noted manner is provided by rotating the retraction assembly mount to "reel in" the strap members (i.e., in the opposite direction to that which was used to deploy the frame assembly). This in turn causes the "free end" of the frame members to move at least generally in the direction of the space object receiving cavity and to direct the captured space object therewithin. Removal of the detachable interconnection between one or more of the strap members and the space object is also affected by this "reeling in" of the strap members. For instance, once the space object is within the space object receiving cavity, further relative movement between the strap members and the space object by the continued operation of the retraction assembly mount will "peel off" those strap members which have adhered to the exterior surface of the space object. As the strap members are pulled into the space object receiving cavity, they may be wrapped around appropriate structure for storage and a subsequent deployment of the frame assembly. That is, once the captured space object is removed from the space object receiving cavity, the frame assembly may once again be deployed in the above-described manner to capture another space object (i.e., the first aspect of the present invention may be used to sequentially capture multiple space objects).

A second aspect of the present invention is embodied in a method for capturing a space object. A space object capturing web is deployed from a space travel vehicle into an at least generally funnel-shaped profile. There is relative movement between this space travel vehicle and a space object which is desired to be "docked" to the space travel vehicle, and which will in turn cause the space object to impact the space object capturing web. Any such impacting of the space object against the space object capturing web adheres the space object to the space object capturing web. Notwithstanding this impact, at least a portion of the space object capturing web is preferably retained in its at least generally funnel-shaped profile (e.g., a portion of the web which is not in contact with the captured space object).

Various refinements exist of the features noted in relation to the subject second aspect of the present invention. Further features may also be incorporated in the subject second aspect of the present invention as well. These refinements and additional features may exist individually or in any combination. Any portion of the space object capturing web which is contacted by the space object will result in the space object being adhered to the space object capturing web in some manner (e.g., magnetically, adhesively, mechanically). However, preferably the space object is adhered to the space object capturing web so as to provide a detachable interconnection therebetween to allow the space object capturing web to be removed from the captured space object as docking of the space object to the space travel vehicle is completed. A circumferential surface of the space object need not and typically will not be adhered to the space object capturing web. Instead, an appropriate interconnecting relationship may be established between the space object capturing web and the space object where the space object capturing web is only effectively "tangent" to the space object.

Deployment of the space object capturing web may be provided by interconnecting the same with a frame assembly which is movable from a stowed frame position to a deployed frame position. When a space object impacts the space object capturing web and is adhered thereto, at least part of the frame assembly may actually move toward, but not too, its stowed frame position. At least some of the energy of the impact may be absorbed by this movement of the frame assembly (e.g., by actively biasing the frame assembly to the deployed position). Moreover, this movement of frame assembly may also increase the area over which the space object capturing web contacts the space object, which in turn increases the area over which the space object is adhered to the space object capturing web. Retracting the frame assembly from its deployed frame position to its stowed frame position may direct the captured space object toward and preferably into a space object receiving cavity. This retraction may also "reel in" the space object capturing web and/or remove the same from the space object.

The space object capturing web may be interconnected with a rotatable retraction assembly to facilitate the deployment and retraction of the frame assembly. Rotation of the retraction assembly in a first direction may be used to "unwind" the space object capturing web and deploy the same as the frame assembly moves from its stowed position to its deployed position. One or more biasing mechanisms may be used to bias the frame assembly to its deployed position, and the "unwinding" of the space object capturing web may allow the biasing mechanism(s) to deploy the frame assembly and the space object capturing web attached thereto. Retraction of the frame assembly with the space object capturing web attached thereto may be affected by rotating the retraction assembly in a second direction which is opposite the above-noted first direction. This rotation may be used to pull or draw the space object capturing web in toward the space object receiving cavity and to collapse the

BRIEF DESCRIPTION OF THE SEVERAL VIEWS OF THE DRAWING

FIG. 3A is a perspective view of the docking system of FIG. 1 in its fully deployed position;

FIG. 3B is a perspective view of the docking system of FIG. 1 in about a 50% retracted position (i.e., about half way between the stowed and fully deployed positions);

FIG. 3C is a perspective view of the docking system of FIG. 1 in about a 95% retracted position (i.e., almost in the stowed position);

FIG. 4A is a cut-away, plan view of a tape retraction assembly for the docking system of FIG. 1, illustrating the position of the same when the docking system of FIG. 1 in its fully deployed position; and FIG. 4B is a cut-away, plan view of the tape retraction assembly for the docking system of FIG. 1, illustrating the position of the same when the docking system of FIG. 1 in its stowed position.

DETAILED DESCRIPTION OF THE INVENTION

Figure 1:
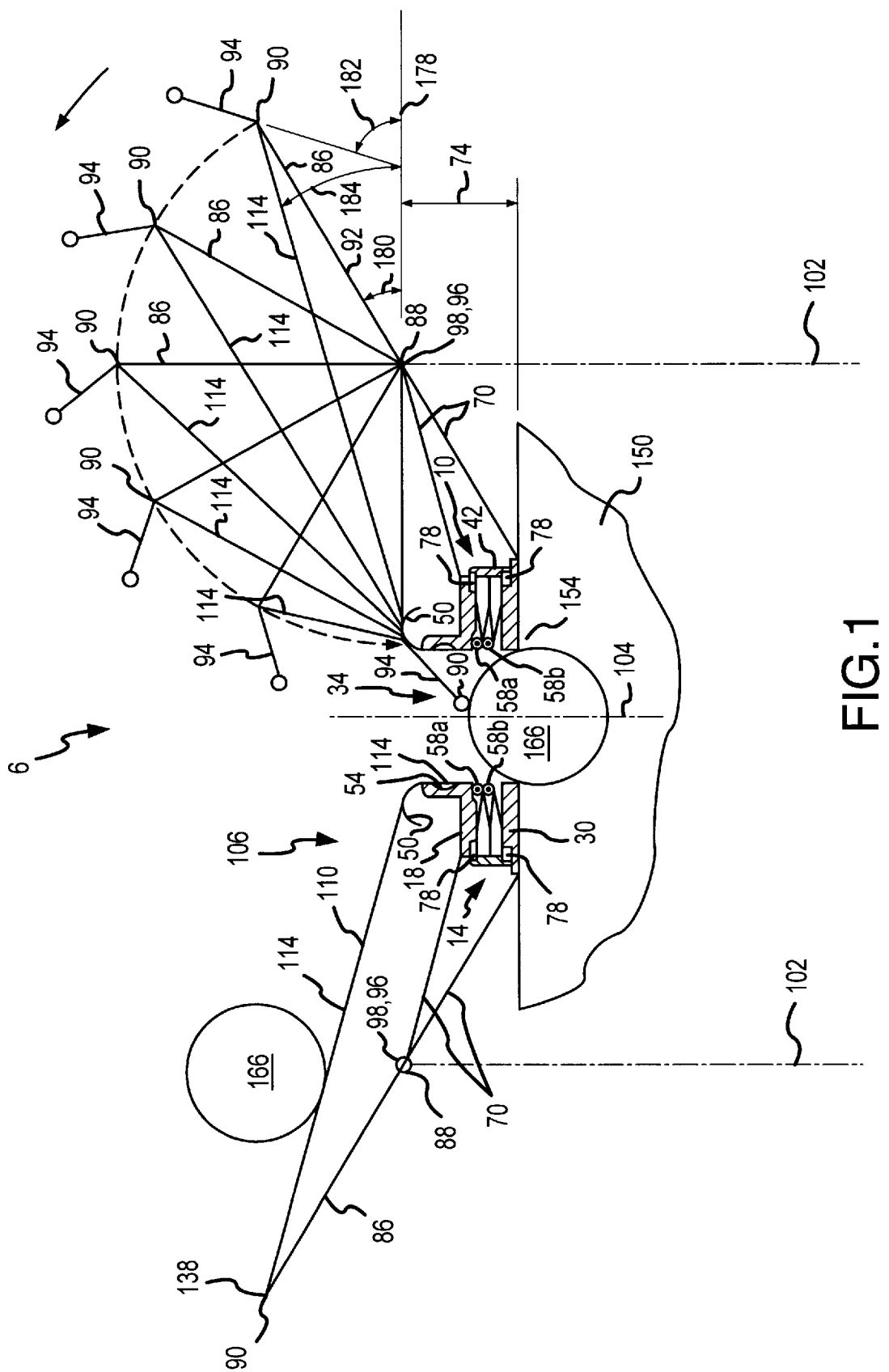
FIG. 1 is a cutaway side view of one embodiment of a docking system for a space travel vehicle, with the left one-half thereof showing the position of the system when a space object has made initial contact therewith, and with the right-half showing the fully deployed, fully stowed, and a plurality of intermediate positions.
Figure 2B:
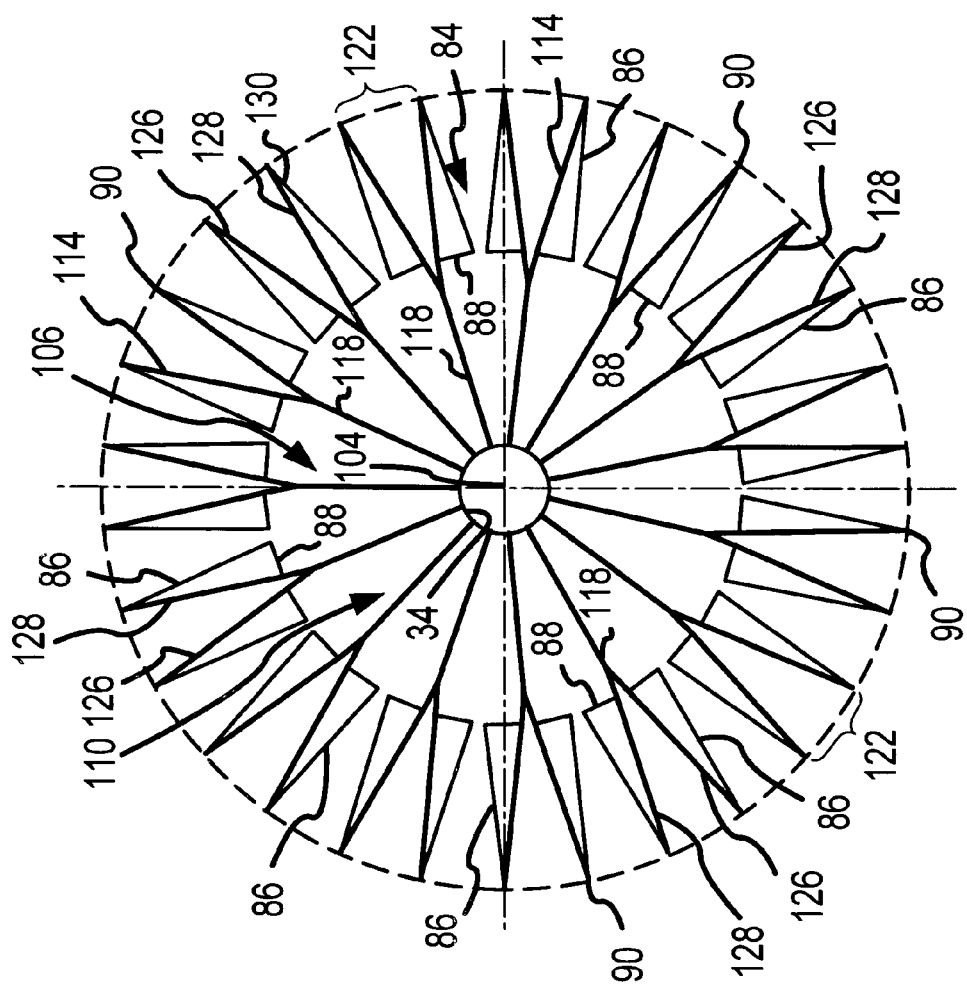
FIG. 2B is a front view of the docking system of FIG. 1 when in its fully deployed position.
Figure 2A:
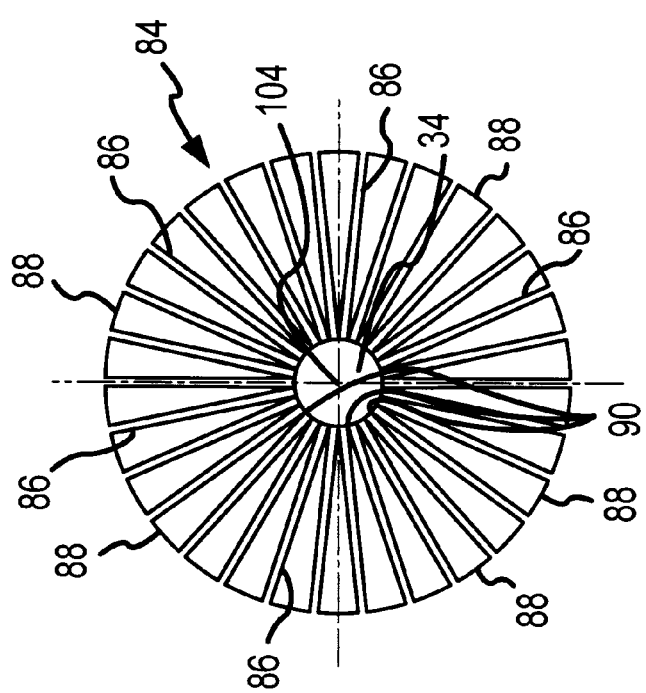
FIG. 2A is a front view of the docking system of FIG. 1 when in its stowed position.

The present invention will now be described in relation to the accompanying drawings which at least assist in illustrating its various pertinent features. One embodiment of a docking system 6 which may be incorporated on a space travel vehicle body 150 of an appropriate space travel vehicle is presented in FIG. 1. One part of the docking system 6 is a capture envelope assembly 106. Deployment of this capture envelope assembly 106 defines a capture envelope or web 110 which is at least generally funnel-shaped or frustumly-shaped for purposes of "collecting" or "capturing" a space object 166 by establishing a detachable engagement therewith so as to dock the same to the space travel vehicle body 150. The capture envelope assembly 106 is interconnected with both a tape retraction assembly 10 which is interconnected with the space travel vehicle body 150, as well as a frame assembly 84. Multiple individual frame members collectively define the frame assembly 84 and in the illustrated embodiment are configured as bipod arms 86. These bipod arms 86 include a free end 90 and a hinge end 88. Each hinge end 88 is pivotally interconnected with the space travel vehicle body 150 at a bipod hinge 98 to allow the frame assembly 84, and therefore the capture envelope assembly 106 interconnected therewith, to move between the fully deployed position and a stowed or retracted position. The fully deployed position is shown in FIGS. 2B and 3A, while the fully stowed position is shown in FIG. 2A. FIGS. 3B–C show intermediate positions of the frame assembly 84, and therefore the capture envelope assembly 106. FIG. 1 shows all of these positions. In this regard, the left side of FIG. 1 shows the frame assembly 84 in the fully deployed position with a space object 166 having initially engaged the docking system 6, while the right side of FIG. 1 shows both the fully deployed and fully stowed positions, with a plurality of intermediate positions therebetween.

The above-noted bipod hinges 98 could be mounted directly on or integrally part of the space travel vehicle 150 (not shown). However, in the illustrated embodiment the docking system 6 is an autonomous unit which in and of itself which may be attached (e.g., detachably interconnected) to the space travel vehicle body 150. In this regard, the bipod hinges 98 are interconnected with and extend outwardly from the tape retraction assembly 10. More specifically, a number of hinge mounting brackets 70 extend outwardly from the mount assembly 14 of the tape retraction assembly 10 and support the bipod hinges 98 for the bipod arms 86 in spaced relation to the space travel vehicle body 150. This is shown in FIG. 1 in the form of an offset 74. Disposing the bipod hinges 98 in spaced relation to the space travel vehicle body 150 provides the function of allowing the docking system 6 to be an autonomous unit which may be attached to existing space travel vehicle bodies 150 on an outer surface thereof, and more specifically allows the tape retraction assembly 10 to interface with an exterior surface of the space travel vehicle bodies 150 which facilitates a retrofit. In any case, the bipod hinges 98 remain in a fixed relative positional relationship to the space travel vehicle body 150 during deployment of the docking system 6 and thereafter, absent any deflection of the hinge mounting brackets 70 which may occur on a space object 166 initially impacting the docking system 6.

The bipod arms 86 of the frame assembly 84 are disposed on a reference circle 102 in arcuately or radially spaced relation as illustrated in FIGS. 1, 2A–B, and 3A–C. That is, the bipod hinges 98 are disposed equidistantly from and about a center 104 of the reference circle 102 in equally radially or arcuately spaced relation (i.e., at different angular positions relative to the center 104 of the reference circle 102). The number of bipod arms 86 and the angular spacing thereof which should be used is a function of a diameter of the space object(s) 166 to be captured by the docking system 6, as well as the size of the capture envelope 110 (e.g., to ensure that the space object 166 does not pass through the capture envelope 110 in a docking operation). A space object receiving cavity or receptacle 154 is at least generally centrally disposed relative to the center 104 of this reference circle 102 as well. Therefore, the bipod hinges 98 are also disposed equidistantly from and about the space object receptacle 154 in equally radially or arcuately spaced relation (i.e., at different angular positions relative to the space object receptacle 154). As can be seen in FIG. 2A, the free end 90 of each bipod arm 86 is disposed at least generally proximate the space object receptacle 154 in the stowed position where the plurality of bipod arms 86 are at least generally disposed within a common plane which provides a reduced storage volume. Deployment of the bipod arms 86 from the stowed position thereby entails pivoting their corresponding free ends 90 at least generally away from or radially outward relative to the space object receptacle 154. Conversely, retraction of the bipod arms 86 from the fully deployed position to the stowed position entails pivoting their corresponding free ends 90 at least generally towards or radially inward relative to the space object receptacle 154 as illustrated by the progression shown in FIGS. 3A–C.

Each bipod arm 86 includes at least a main body section 92 which is at least generally of a triangular configuration as illustrated in FIGS. 2A–B and 3A–C. Other configurations may be appropriate for the individual frame members of the frame assembly 84 as well. The above-noted hinge end 88 of each bipod arm 86 is on one extreme of each main body section 92, while the above-noted free end 90 of each bipod arm 86 defines the other extreme of each main body section 92 (where the main body section 92 comes to a "point"). At least some of the bipod arms 86 may, and preferably do, also include a bipod end extension 94 which extends from the main body section 92 of the bipod arm 86 in a different orientation therefrom and as illustrated in FIG. 1 (no extensions 94 being illustrated in FIGS. 2A–B or 3A–C). In one embodiment, there are 30 of the above-noted bipod arms 86 and 3 of these bipod arms 86 include a bipod end extension 94 of the above-noted type. At least one of the bipod arms 86 preferably includes a bipod end extension 94. Other numbers of bipod arms 86 may be utilized, as well as bipod arms 86 which include a bipod end extension 94. Those bipod arms 86 which include a bipod end extension 94 facilitate the directing of a space object 154 which is adhered to the capture envelope 110 (of the capture envelope assembly 106) toward and preferably into the space object receptacle 154, as well as the retention of the same therein in a manner which will be discussed in more detail below. Another option which could be utilized for retaining a captured space object 166 in the space object receptacle 154 is to mount a cover of some type on one of the bipod arms 86. Although the bipod end extensions 94 would not then be required for this retention function, it still may be desirable to include at least one such bipod end extension 94 to facilitate the directing of a captured space object 166 into the space object receptacle 154. It may be possible to not utilize any bipod end extensions 94 as well.

There are a number of ways to characterize the orientation of the above-noted bipod end extensions 94. One way is to note that the bipod end extensions 94 are "cocked" or "tipped in" relative to their corresponding main body extension 92 of the subject bipod arm 86. Another way is to note that the bipod end extensions 94 are oriented at a steeper slope than their corresponding main body section 92 of the subject bipod arm 86. Yet another way is to note that the bipod end extensions 94 are disposed at a second angle 182, and that their corresponding main body sections 92 of the bipod arms 86 are disposed at a first angle 180. Both the first angle 180 and second angle 182 may be measured from a reference plane 178 which contains the plurality of hinge ends 88 of the bipod arms 86. The second angle 182 is of a greater magnitude than the magnitude of the first angle 180.

The above-noted frame assembly 84 is biased to the deployed position of FIG. 1, 2B, and 3A by an appropriate biasing mechanism, such as by one or more torsion springs 96. These torsion springs 96 may be located at each of, or may in fact define/be incorporated into, the above-noted bipod hinges 98. Other types of such biasing mechanisms may be utilized. Moreover, the mechanism for biasing the frame assembly 84 to the deployed position may be disposed at different locations.

As noted above, the capture envelope assembly 106 is interconnected with the frame assembly 84. Continuing to refer to FIGS. 1, 2A–B, and 3A–C, the capture envelope assembly 106 generally includes a capture envelope or web 110. This capture envelope 110 is defined by a plurality of individual strap members or tapes 114. Preferably these tapes 114 include a surface to which a space object 166 may adhere when the space object 166 comes into contact with the capture envelope 110 for docking to the space travel vehicle body 150. This surface may exist over the entire extent of the surface of the tape 114 which defines the capture envelope 110 (preferred), or may be intermittently disposed along this surface. In one embodiment, the noted surface on the tape 114 is one of a hook or a loop component of a hook and loop type fastening system (e.g., Velcro), while the other of the hook or loop component would then be included on the exterior surface of the space object 166 which is to be docked to the space travel vehicle body 150. In the case of a Velcro system, both the hooked surface and the looped surface may be formed from various materials, including various polymers (e.g., plastics, nylon) as well as metals. Metals may be preferable to provide durability in the low temperature environments encountered in space. There may be other ways to adhere the space object 166 to the capture envelope 110 through establishing some type of bond (e.g., utilizing magnetic principles, adhesives or chemical interaction).

Each tape 114 of the capture envelope assembly 106 includes a bipod arm end 138 which is attached to a pair of adjacently disposed bipod arms 86 at the end of their respective main sections 118 (i.e., the tapes 114 are not attached to the bipod end extensions 94). In this regard, each tape 114 includes a main section 118 and an end section 122 having a first leg 126 which extends toward and is attached to one of the bipod arms 86, and a second leg 130 which extends toward and is attached to an adjacent bipod arm 86 such that the tapes 114 have at least a generally Y-shaped profile on at least an end portion thereof. Therefore, the ends of the first leg 126 and the second leg 130 collectively define the bipod arm end 138. Other configurations could be used for the tapes 114 in certain situations, such as a purely linear configuration where one tape 114 would attach to only a single bipod arm 86 (not shown).

Each tape 114 extends from its corresponding pair of bipod arms 86 radially inwardly toward the space object receptacle 154, and then downwardly therewithin, when the frame assembly 84/capture envelope assembly 106 are in their deployed positions and as illustrated in FIG. 1. There is a space between the capture envelope 110 (collectively defined by the plurality of individual tapes 114) and the frame assembly 84 between where each tape 114 exits the space object receptacle 154 and where each tape 114 attaches to its corresponding bipod arm(s) 86. One factor which contributes to the existence of this "vertical spacing" between the capture envelope 110 and the "underlying" frame assembly 84 is that the bipod hinges 98 are spaced radially outwardly from the space object receptacle 154. A "trampoline-like" configuration is thereby provided by the interrelationship between the frame assembly 84 and the capture envelope assembly 106.

FIGS. 1 and 3A both illustrate that the frame assembly 82 and capture envelope assembly 106 each define an at least generally funnel-shaped or frustumly-shaped (i.e., truncated cone) surface, with the funnel/frustumly-shaped surface defined by the capture envelope assembly 106 being disposed entirely within the funnel/frustumly-shaped surface defined by the frame assembly 84. The funnel/frustumly-shaped surface defined by the frame assembly 84 is disposed at the above-noted first angle 180. In one embodiment, the magnitude of the first angle 180 (again measured relative to the reference plane 178) is between about 25° and about 35°, and in the illustrated embodiment is about 30°. The funnel/frustumly-shaped surface defined by the capture envelope assembly 106 is disposed at a third angle 184 which is also measured relative to the reference plane 178. In one embodiment, the magnitude of the third angle 184 is between about 10° and about 20°, and in the illustrated embodiment is about 15°. Generally, the magnitude of the third angle 184 should be selected to as to provide a sufficient space between the tapes 14 and the "underlying" bipod hinges 98 or so as to allow for a certain amount of "flexing" of the capture envelope 110 when docking a space object 166 thereto to "dampen" the shock of impact and without having any portion of the capture envelope 110 contact any portion of the underlying frame assembly 84.

Both the capture envelope assembly 106 and the frame assembly 84 are purposefully collapsed or retracted after a space object 166 has contacted and adhered to the capture envelope 110 to complete the docking of the space object 166 to the space travel vehicle body 150. This is affected by the above-noted tape retraction assembly 10 which "reels in" the plurality of tapes 114 in this instance and which is illustrated in FIG. 1 and FIGS. 4A–B. The tape retraction assembly 10 includes a housing or mount assembly 14 which is detachably interconnected with the space travel vehicle body 150. Components of the mount assembly 14 include an upper housing or section 18 and a lower housing or section 30 which are vertically spaced (i.e., the upper section 18 and lower section 30 of the mount assembly 14 are disposed in vertically spaced relation). A throat or central aperture 34 extends entirely through the mount assembly 14 and may define at least part or all of a space object receptacle 154, or where the space object 166 is docked to the space travel vehicle body 150. All or part of the space object receptacle 154 may be incorporated in the space travel vehicle body 150 as well. In the illustrated embodiment, the space object receptacle 154 is defined in part by the throat 34 of the mount assembly 14 and by an aligned recess in the space travel vehicle body 150.

An annular throat extension 50 is disposed on at least an upper portion of the space object receptacle 154 and extends above or beyond the upper section 18 of the mount assembly 14 to provide a pliable/flexible interface of sorts between the tape retraction assembly 10 and the tapes 114 of the capture envelope assembly 106. Another function provided by the flexible or pliable throat extension 50 is that it may potentially "soften" the impact between the space object 166 and the docking system 6 if the initial contact therebetween is directed to the mount assembly 14. It may be possible to alleviate the need for the throat extension 50, such as by forming the upper section 18 of the mount assembly 14 from a "softer" material to guard against an impact with the space object 166 when docking the same to the space travel vehicle body 150.

A plurality of upper tape guide rollers 54 are disposed within the upper section 18 of the mount assembly 14 along the portion thereof which defines the upper portion of the central aperture 34. It may be desirable to recess these rollers 54 within the upper section 18 to a degree so as to reduce the potential for undesirably impeding the movement of the space object 166 downwardly within the space object receptacle 154 during docking operations. These upper tape guide rollers 54 are radially spaced about the central aperture 34 in equidistant fashion. A plurality of radially spaced (i.e., about the central aperture 34) first lower tape guide rollers 58*a* and a plurality of radially spaced (i.e., about the central aperture 34) second rollers 58*b* are disposed within the space between the upper section 18 of the mount assembly 14 and the lower section 30 of the mount assembly 14, with the first lower tape guide rollers 58*a* being disposed further from the space travel vehicle 150 than the second lower tape guide rollers 58*b* (i.e., at a higher elevation in the docking system 6). Axles about which each of the first and second lower tape guide rollers 58*a* and 58*b* rotate may be rotatably supported by a plurality of axle mounts 60 fixed to the mount assembly 14 (shown only for the second lower tape guide rollers 58*b*). A first reference plane which contains the rotational axes of the upper tape guide rollers 54, a second reference plane which contains the rotational axes of the first lower tape guide rollers 58*a*, and a third reference plane which contains the rotational axes of the second lower tape guide rollers 58*b*, are disposed in at least substantially parallel relation. Moreover, the centers (between their two ends) of the first lower tape guide rollers 58*a* are disposed at different angular positions than the centers (between their two ends) of the second lower tape guide rollers 58*b*. In one embodiment, the center of a first lower tape guide roller 58*a* is disposed centrally between, on an angular measurement basis, the two centers of each adjacent pair of second lower tape guide rollers 58*b*.

The plurality of tapes 114 extend from the frame assembly 84, downwardly within the space object receptacle 154 around a corresponding upper tape guide roller 54, around either the first lower tape guide roller 58*a* or the second lower tape guide roller 58*b*, and then radially outwardly from the space object receptacle 154. An outer ring 42 is disposed about the upper section 18 and lower section 30 of the mount assembly 14. The end of each tape 114, namely that which is opposite its bipod arm end 138, is attached to this outer ring 42, and therefore such may be referred to as a retraction assembly end 134. In this regard, a plurality of radially spaced outer tape guide rollers 66 are radially spaced about the space object receptacle 154 at a location between the outer ring 42 and the space object receptacle 154. Each outer tape guide roller 66 is at least generally spool-shaped in that it includes a head or flange 62 or the like at each of its two ends to retain the tapes 114 therebetween which are wrapped around the outer periphery of the subject roller 66 between its pair of heads 62 or flanges. One outer tape guide roller 66 is disposed radially outwardly from each first lower tape guide roller 58*a* and each second lower tape guide roller 58*b* (i.e., along a line which extends outwardly from the center 104 of the space object receptacle 154). The rotational axes of these outer tape guide rollers 66 are least generally perpendicular to those rotational axes of the upper tape guide rollers 54 and the first and second lower tape guide rollers 58*a*, 58*b*. A tape 114 extending radially outwardly from one of the first or second lower tape guide rollers 58*a* or 58*b* thereby extends about its corresponding outer tape guide roller 66 for attachment to the outer ring 42 at a location which is not radially aligned with its corresponding second lower tape guide roller 58 and outer tape guide roller 66.

Relative rotational motion between the mount assembly 14 and the outer ring 42, with the retraction assembly end 134 of each tape 114 being affixed thereto "reels in" each of the tapes 114 by wrapping the same around the plurality of outer tape guide rollers 66. This relative rotational motion is made available by mounting a plurality of radially spaced outer ring rollers 78 (FIG. 1) which are disposed further from the center 104 than the lower tape guide rollers 58*a*, 58*b*, at least generally at the same radial distance as the outer tape guide rollers 66, to establish rolling contact with the inner periphery of the outer ring 42. One end of each of the outer ring rollers 78 is rotatably mounted on either the upper section 18 or the lower section 30 of the mount assembly 14. In one embodiment, three equally spaced pairs of such outer ring rollers 78 are provided to appropriately center the outer ring 42. Other ways of providing relative movement between the outer ring 42 and the mount assembly 14 could be utilized. For instance, a single bearing could also be utilized to provide for the desired relative motion between the outer ring 42 and the mount assembly 14.

An appropriate drive assembly 46 is interconnected with the outer ring 42 to rotate the outer ring 42 at the desired time (e.g., a rotational drive source and appropriate interconnecting gearing). Only one such drive source is required for all of the tapes 114 (e.g., a single motor can simultaneously retract all of the tapes 114). Rotation of the outer ring 42 in one direction by the drive assembly 46 is used to deploy the frame assembly 84 and the capture envelope assembly 106, while rotation of the outer ring 42 in the opposite direction by the drive assembly 46 is used to retract the frame assembly 84 and the capture envelope assembly 106 to the stowed position. Therefore, the docking system 6 is not limited to single use applications, but instead may be used any number of times to dock space objects 166 to the space travel vehicle body 150 on which the docking system 6 is mounted.

The foregoing enhances the docking of a space object 166 to a space travel vehicle body 150 which incorporates (either integrally or by separate attachment) the docking system 6. In this regard, the frame assembly 84 with the capture envelope assembly 106 attached thereto are deployed to define the capture envelope 110. With the frame assembly 84 being in the position illustrated in FIG. 2A and with the plurality of tapes 144 being wrapped around the outer peripheries of each of the outer tape guide rollers 66 as presented in FIG. 4B (i.e., a given tape 144 will be wrapped around at least two of, and possibly all of the outer tape guide rollers 66, depending upon the length of the tapes 114), the outer ring 42 is rotated in the direction of the arrow "A" presented in FIG. 4B. This "unwinds" the tapes 114 from the outer tape guide rollers 66 and allows the torsion springs 96 to deploy the frame assembly 84 by pivoting the ends 90 of the bipod arms 86 at least generally away from the space object receptacle 154. The plurality of tapes 114 are "drawn" or "pulled" out of the space object receptacle 154 by the biasing forces which are exerted on the frame assembly 84 to bias the same to the fully deployed position. Tension is preferably maintained in the tapes 114 during this deployment of the frame assembly 84. Rotation of the outer ring 42 in the direction of the arrow "A" in FIG. 4B is terminated when the frame assembly 84 has reached the position illustrated in FIG. 1 and in one embodiment with the tape retraction assembly 10 being in the position presented in FIG. 4A.

Relative movement between the space object 166 and the space travel vehicle body 150 with the docking system 6 being fully deployed and as described, assuming proper alignment, will then cause the space object 166 to contact a portion of the capture envelope 110 (e.g., one or more of the individual tapes 114). A number of things happen on this impact. One is that the space object 166 will actually adhere or "stick" to the capture envelope 110. At least part of the capture envelope 110 will also deflect at least generally toward the "underlying" frame assembly 84. This in turn will cause at least certain of the bipod arms 86 (e.g., those "aligned" with the impact) to pivot in a manner so as to direct their corresponding free ends 90 actually back toward the space object receptacle 154 or toward the stowed position for the frame assembly 84 and the capture envelope 110. Movement of the frame assembly 84 of this type in turn may provide a number of functions. First, this type of pivotable movement of the bipod arms 86 will work against the biasing forces being exerted thereon by the torsion spring(s) 96 (which again bias the frame assembly 84 to the deployed position). This can then provide for absorption of at least part of the energy transferred to the docking system 6 by the impact of the space object 166 thereon. Second, the noted pivotable movement of these bipod arms 86 back toward, but not to, the stowed position may in fact increase the amount of surface area of the capture envelope 110 which actually contacts the space object 166. Assume that when the space object 166 initially contacts the capture envelope 110, this contact is established at a location which is tangent to the capture envelope 110 (i.e., "point" contact). By allowing the capture envelope 110 to "wrap" itself around the space object 166 to at least a certain degree by the noted pivoting of the frame assembly 84, the amount of area of the capture envelope 110 which interfaces with the space object 166 may increase. Again, preferably the space object 166 adheres to all portions of the capture envelope 100 which it contacts (e.g., by the "hook and loop" fastening system incorporated on both the tapes 114 of the capture envelope 110 and on the exterior surface of the space object 166), such that the space object 166 will adhere to the capture envelope 110 at a "point" of sorts upon the initial engagement therewith. Increasing the area of the capture envelope 110 which interfaces with the now captured space object 166 may therefore serve to more securely retain the space object 166 within the capture envelope 110 until completion of the docking procedure by adhering the space object 166 to the capture envelope 110 over a larger area. This is provided by deflection of the capture envelope 110 which is maintained in tension by the torsion springs 96 associated with the frame assembly 84, and is further enhanced by the pivoting of at least part of the frame assembly 84 back toward the stowed position by the impacting of the space object 166 on the capture envelope 110. It should be appreciated that not all of the bipod arms 86 will "collapse" in the above-noted manner when a space object 166 contacts the capture envelope 110. In fact, other portions of the capture envelope 110 may retain the original funnel-shaped profile.

Completion of the docking of the space object 166 to the space travel vehicle 150, once detachably connected to the capture envelope 110, entails activating the drive assembly 46 for the outer ring 42 of the tape retraction assembly 10 to rotate the same relative to the mount assembly 14 in the direction of the arrow B illustrated in FIG. 4A. This is opposite to that which was used to deploy the frame assembly 84. Rotation of the outer ring 42 in the direction of the arrow B, with the retraction assembly end 134 of each tape 114 being attached thereto, pulls the tapes 114 downwardly within the space object receptacle 154 and then radially outwardly therefrom over rollers 58a or 58b where the same are wrapped about the outer tape guide rollers 66. This retraction of the tapes 114 in turn causes the frame assembly 84 to pivot by directing the free end 90 of each bipod arm 86 back toward the space object receptacle 154, which in turn directs the captured space subject 166 toward the space object receptacle 154 is well. Once at the mouth of the space object receptacle 154, further relative movement between the tapes 114 and the space object 166 "peels" the tapes 114 away from the space object 166 (i.e., disengages the detachable interconnection therebetween). Completion of the docking is provided by the bipod end extensions 94 directing the space object 166 further downwardly within the space object receptacle 154 where the bipod end extensions 94 will continue to overly the space object 166 within the space object receptacle 154 to retain the same therein.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A space travel vehicle, comprising:
    a space travel vehicle body;
    a space object docking system interconnected with said space travel vehicle body and comprising:
        a frame assembly interconnected with said space travel vehicle body and comprising a plurality of frame members, wherein each said frame member comprises first and second ends, wherein said first end of each said frame member is pivotally connected to said space travel vehicle body, wherein said first ends of said plurality of frame members are mounted about a reference point in spaced relation, and wherein said plurality of frame members are movable from a stowed position to a deployed position where said second end of each said frame member pivots away from said space travel vehicle to allow said plurality of frame members to collectively define an at least generally funnel-shaped profile; and
        a capture envelope assembly which is interconnected with said frame assembly and which occupies a space within said at least generally funnel-shaped profile.

2. A space travel vehicle, as claimed in claim 1, further comprising:
    a space object receiving cavity associated with said space travel vehicle body.

3. A space travel vehicle, as claimed in claim 2, wherein:
    said first ends of said plurality of frame members are collectively circumferentially disposed about said space object receiving cavity.

4. A space travel vehicle, as claimed in claim 2, wherein:
    when said frame assembly is in said stowed position, said second end of each said frame member is disposed at least generally proximate said space object receiving cavity and said first end of each said frame member is disposed further from said space object receiving cavity than its corresponding said second end.

5. A space travel vehicle, as claimed in claim 2, wherein:
    at least some of said frame members comprise means for directing a space object captured in said capture envelope assembly into said space object receiving cavity.

6. A space travel vehicle, as claimed in claim 2, wherein:
    at least part of at least some of said frame members is disposed within said space object receiving cavity when said frame assembly is in said stowed position.

7. A space travel vehicle, as claimed in claim 1, wherein:
    each said frame member comprises a bipod arm.

8. A space travel vehicle, as claimed in claim 1, wherein:
    when said frame assembly is in said stowed position, said second end of each said frame member is disposed closer to said reference point than its corresponding said first end, and wherein when said frame assembly is in said deployed position, said second end of each said frame member is disposed further from said reference point that its corresponding said first end.

9. A space travel vehicle, as claimed in claim 1, wherein:
    said first ends of said plurality of frame members are disposed on a reference circle which in turn is concentrically disposed about said reference point, and wherein said first ends of said plurality of frame members are spaced along said reference circle.

10. A space travel vehicle, as claimed in claim 1, wherein:
    at least some said frame members comprise first and second frame member sections, said first and second frame member sections being disposed in different orientations relative to each other.

11. A space travel vehicle, as claimed in claim 10, wherein:
    when said frame assembly is in said deployed position, each said first frame member section is disposed so as to define a first slope and each said second frame member section is disposed so as to define a second slope, wherein a magnitude of said second slope is greater than a magnitude of said first slope.

12. A space travel vehicle, as claimed in claim 1, wherein:
    said capture envelope assembly comprises a space object capturing web.

13. A space travel vehicle, as claimed in claim 12, wherein:
    an entirety of said space object capturing web is disposed entirely within said funnel-shaped profile of said frame assembly when in said deployed position.

14. A space travel vehicle, as claimed in claim 1, wherein:
    said capture envelope assembly comprises a plurality of individual strap members.

15. A space travel vehicle, as claimed in claim 14, wherein:
    each of said plurality of strap members comprises Velcro.

16. A space travel vehicle, as claimed in claim 14, wherein:
    each said strap member comprises means for detachably engaging a space object to be docked to said space travel vehicle.

17. A space travel vehicle, as claimed in claim 16, further comprising:
    means for removing any said strap members detachably engaged to said space object when captured in said space object capturing web.

18. A space travel vehicle, as claimed in claim 14, wherein:
    each of said plurality of strap members comprises first and second ends, wherein said second end of each said strap member is attached to at least one of said frame members at least generally proximate its corresponding said second end.

19. A space travel vehicle, as claimed in claim 18, wherein:
    said second end of each said strap member is at least generally Y-shaped such that each said strap member is attached to two of said frame members.

20. A space travel vehicle, as claimed in claim 14, wherein:
    when said frame assembly is in said deployed position, each said strap member extends at least generally away from said reference point for interconnection with at least one of said frame members at a first location, and wherein between each said first location and said reference point said plurality of strap members are disposed in spaced relation to said plurality of frame members.

21. A space travel vehicle, as claimed in claim 14, further comprising:
   a strap member retraction assembly interconnected with each of said strap members.

22. A space travel vehicle, as claimed in claim 21, wherein:
   said strap member retraction assembly also moves said frame assembly from said deployed position to said stowed position and directs a space object captured within said space object capturing web within a space object receiving cavity of said space travel vehicle.

23. A space travel vehicle, as claimed in claim 1, wherein:
   said space travel vehicle further comprises a space object receiving cavity;
   said first ends of said plurality of frame members are disposed radially outwardly from and circumferentially disposed about said space object receiving cavity;
   said second end of each said frame member is disposed closer to said space object receiving cavity than its corresponding said first end when said frame assembly is in said stowed position;
   said capture envelope assembly comprises a plurality of individual strap members, wherein when said frame assembly is in said deployed position each said strap member extends outwardly from said space object receiving cavity to a first interconnection with at least one of said frame members at a location which is beyond said first end of said at least one of said frame members, and wherein between said space object receiving cavity and each said first interconnection said strap members are disposed in spaced relation to said frame members.

24. A space travel vehicle, as claimed in claim 23, wherein:
   each of said strap members comprises means for detachably engaging a space object captured in said capture envelope assembly.

25. A space travel vehicle, as claimed in claim 23, further comprising:
   a strap member retraction assembly interconnected with each of said strap members.

26. A space travel vehicle, as claimed in claim 25, wherein:
   said strap member retraction assembly also moves said frame assembly from said deployed position to said stowed position, wherein at least some of said frame members comprise means for directing said space object captured on at least part of said capture envelope assembly within said space object receiving cavity on said space travel vehicle, and wherein said space travel vehicle further comprises means for removing any of said strap members attached to said space object as said space object is directed into said space object receiving cavity on said space travel vehicle.

27. A space travel vehicle, as claimed in claim 1, further comprising:
   means for biasing said frame assembly to said deployed position.

28. A method for capturing a first space object, comprising the steps of:
   deploying a space object capturing web from a space travel vessel into an at least generally funnel-shaped profile;
   advancing said space travel vehicle relative to said first space object;
   impacting said first space object against said space object capturing web using said advancing step; and
   adhering said first space object to said space object capturing web while at least a portion of said space object capturing web retains said at least generally funnel-shaped profile.

29. A method, as claimed in claim 28, wherein:
   said deploying step comprises maintaining said space object capturing web in tension.

30. A method, as claimed in claim 28, wherein:
   said deploying step comprises interconnecting said space object capturing web with a frame assembly and biasing said frame assembly to a deployed position.

31. A method, as claimed in claim 28, wherein:
   said deploying step comprises interconnecting said space object capturing web with a frame assembly which is movable between a stowed frame position and a deployed frame position, and wherein said impacting step comprises moving at least a portion of said frame assembly toward said stowed frame position.

32. A method, as claimed in claim 31, wherein:
   said moving step comprises increasing a contact area between said space object capturing web and said first space object.

33. A method, as claimed in claim 28, wherein:
   said adhering step is executable on any portion of said space object capturing web.

34. A method, as claimed in claim 28, wherein:
   said adhering step comprises having said space object capture web engage something less than a circumferential portion of said first space object.

35. A method, as claimed in claim 28, wherein:
   said adhering step provides any type of detachable engagement between said space object capturing web and said first space object.

36. A method, as claimed in claim 28, wherein:
   said deploying step comprises pivoting a frame assembly relative to said space travel vehicle, wherein said space object capturing web is attached to said frame assembly.

37. A method, as claimed in claim 36, further comprising the steps of:
   retracting said frame assembly after said adhering step; and
   directing said first space object into a space object receiving cavity associated with said space travel vehicle using said retracting step.

* * * * *